United States Patent [19]

Yasuda

[11] Patent Number: 5,598,743
[45] Date of Patent: Feb. 4, 1997

[54] CORE WIRE LENGTH ADJUSTER

[75] Inventor: Tetsuro Yasuda, Sanda, Japan

[73] Assignee: Hi-Lex Corporation, Battle Creek, Mich.

[21] Appl. No.: 410,500

[22] Filed: Mar. 24, 1995

[51] Int. Cl.⁶ ................................ F16C 1/10; F16C 1/26
[52] U.S. Cl. .................. 74/502.4; 74/502.6; 403/11; 403/23; 403/292; 403/315
[58] Field of Search ................... 74/502.4, 502.6; 403/11, 23, 292, 294, 315, 316

[56] References Cited

U.S. PATENT DOCUMENTS

| | | | |
|---|---|---|---|
| 3,572,160 | 3/1971 | Stahr | 74/502.4 |
| 3,860,352 | 1/1975 | Carlson | 403/263 |
| 4,173,157 | 11/1979 | Miller et al. | 74/501.6 |
| 4,175,450 | 11/1979 | Bennett | 74/502.4 |
| 4,177,691 | 12/1979 | Fillmore | 74/502.4 |
| 4,294,133 | 10/1981 | Hurley | 74/502.4 |
| 4,331,041 | 5/1982 | Bennett | 74/502.4 X |
| 4,348,348 | 9/1982 | Bennett et al. | 264/255 |
| 4,366,725 | 1/1983 | Kondo | 74/502.4 |
| 4,386,755 | 6/1983 | Bennett et al. | 249/83 |
| 4,406,177 | 9/1983 | Bennett et al. | 74/500.5 |
| 4,581,953 | 4/1986 | Walston et al. | 74/502.4 |
| 4,676,119 | 6/1987 | Spease | 74/502.6 |
| 4,694,705 | 9/1987 | Frankhouse et al. | 74/500.5 |
| 4,726,251 | 2/1988 | Niskanen | 74/502 |
| 4,763,541 | 8/1988 | Spease | 74/500.5 |
| 4,793,050 | 12/1988 | Niskanen | 29/455.1 |
| 4,805,479 | 2/1989 | Brightwell | 74/502.4 |
| 4,841,806 | 6/1989 | Spease | 74/502.6 X |
| 4,869,123 | 9/1989 | Stocker | 74/501.5 R |
| 4,887,930 | 12/1989 | Chaczyk et al. | 403/379 |
| 4,889,006 | 12/1989 | Kolinske et al. | 74/502.4 |
| 4,947,704 | 8/1990 | Gokee | 74/502.4 |
| 5,003,838 | 4/1991 | Pospisil et al. | 74/502.4 |
| 5,161,428 | 11/1992 | Petruccello | 74/502.4 |
| 5,163,338 | 11/1992 | Sharp et al. | 74/502.4 |
| 5,207,116 | 5/1993 | Sultze | 74/502.6 X |
| 5,253,948 | 10/1993 | Butler | 403/289 |
| 5,295,408 | 3/1994 | Nagle et al. | 74/502.6 |
| 5,394,770 | 3/1995 | Boike et al. | 74/502.6 X |
| 5,398,566 | 3/1995 | Moore | 74/502.6 X |
| 5,435,202 | 7/1995 | Kitamura | 74/502.6 X |
| 5,477,745 | 12/1995 | Boike et al. | 74/502.6 |
| 5,531,134 | 7/1996 | Petruccello | 74/502.4 |

FOREIGN PATENT DOCUMENTS 6-147215  5/1994  Japan .................. 74/502.4

Primary Examiner—Blair Johnson
Assistant Examiner—Andrea Chop
Attorney, Agent, or Firm—Young & Basile, P.C.

[57] ABSTRACT

An end fitting for a cable assembly including a conduit and a core wire slidably positioned within the conduit. The fitting includes a housing, an elongated guide member, and a locking clip. The housing includes a rear wall having an aperture, a forward wall having an rear wall aperture axially aligned with the aperture, a lock window positioned between the rear and forward walls, and a forward window spaced forwardly from the lock window. The guide member is secured at its rear end to the core wire and is slidably received at its forward end in the housing apertures. The guide member includes a plurality of axially spaced serrations and a head portion at its forward end which is radially compressible to allow the guide member to be passed through the apertures in the walls whereafter the head member expands to preclude withdrawal of the guide member from the housing. The locking clip is slidably mounted in the lock window and includes a plurality of axially spaced serrations for locking coaction with the serrations on the guide member so as to lock the guide member in any position of axial adjustment relative to the housing. The end fitting may also include an accessory member which is mounted for sliding movement on the housing between a shipping position in which it precludes movement of the locking clip to its engaged position and an operational position in which it provides a visual indication that the locking clip is in its engaged position.

14 Claims, 5 Drawing Sheets

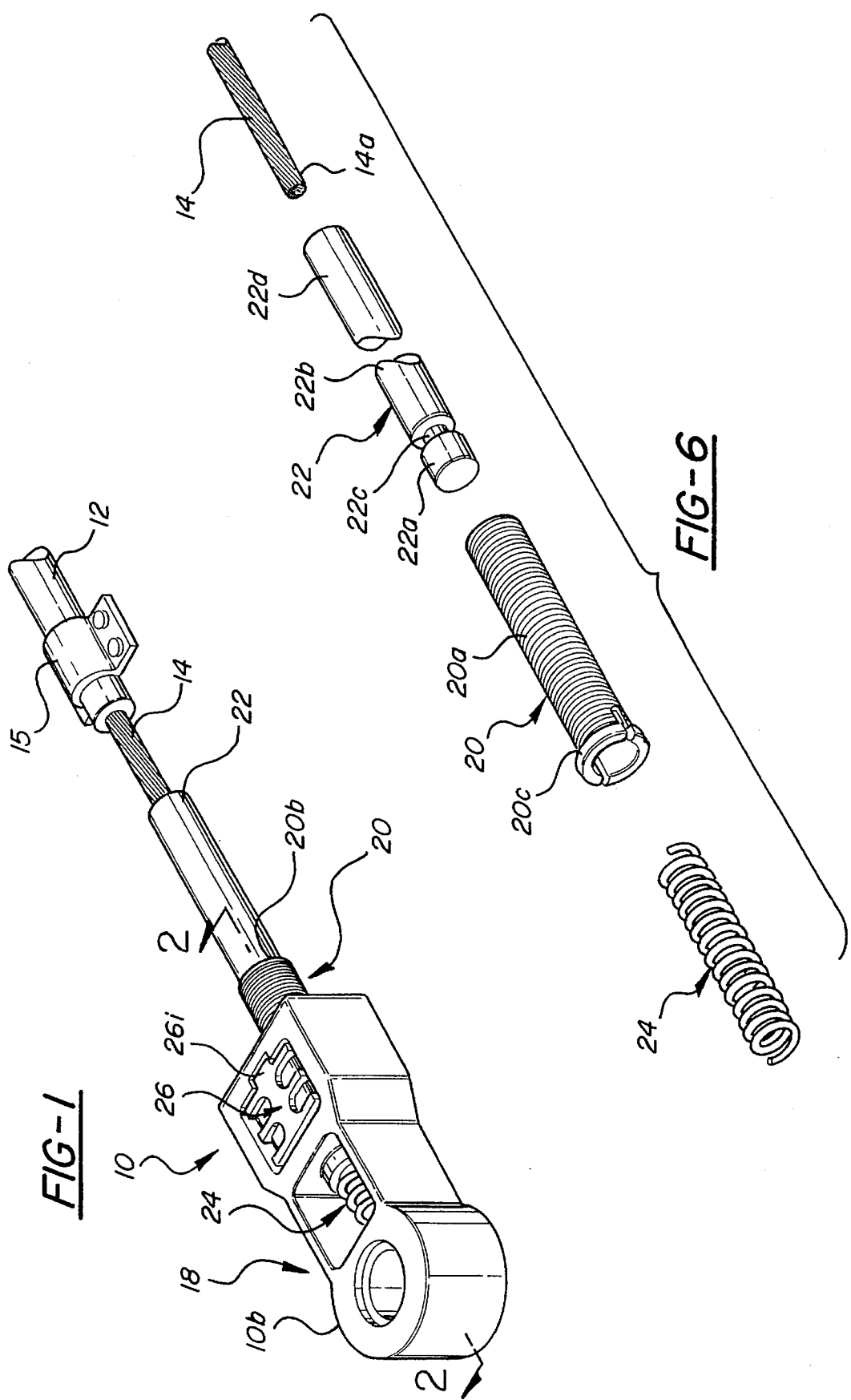

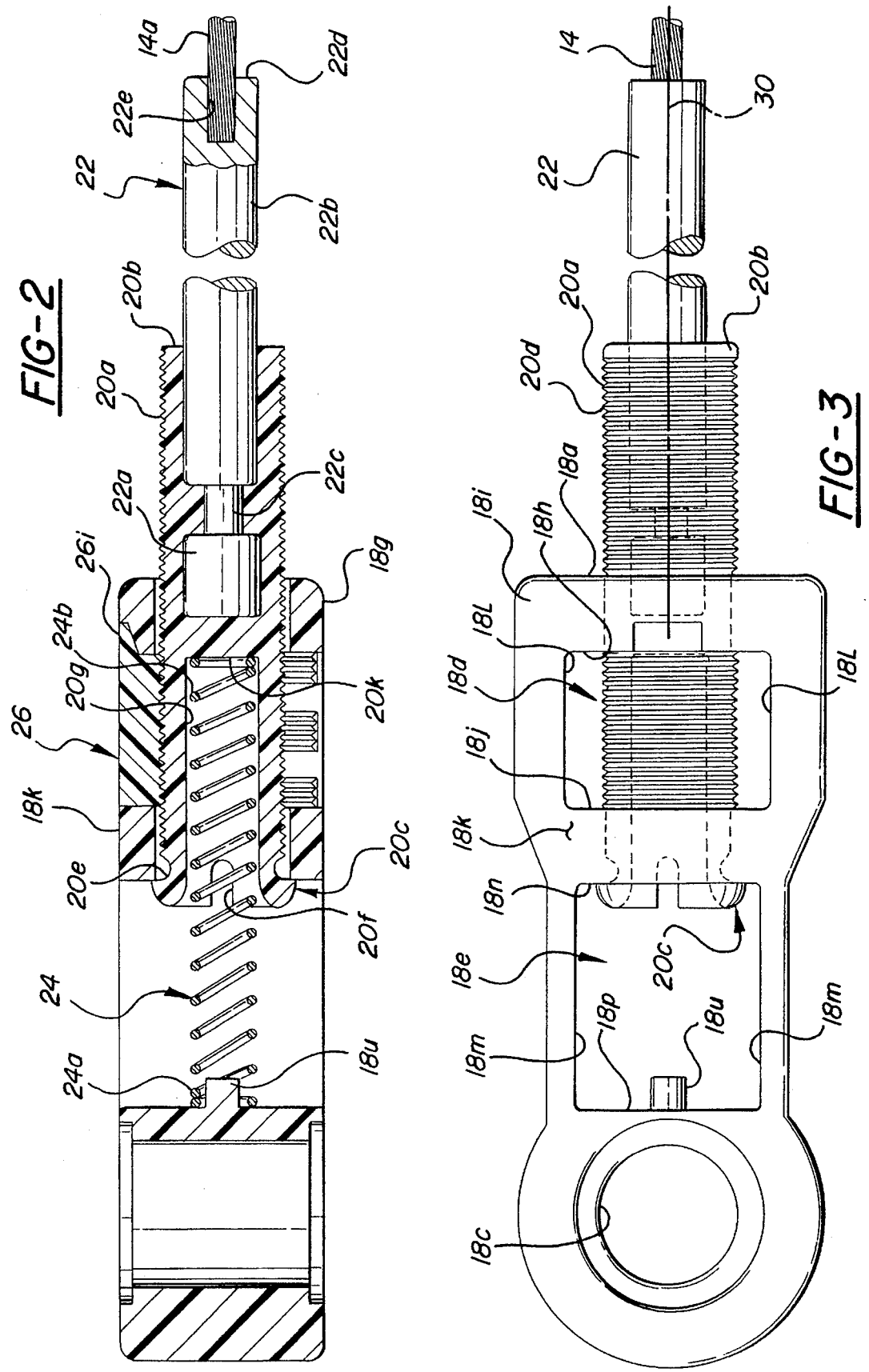

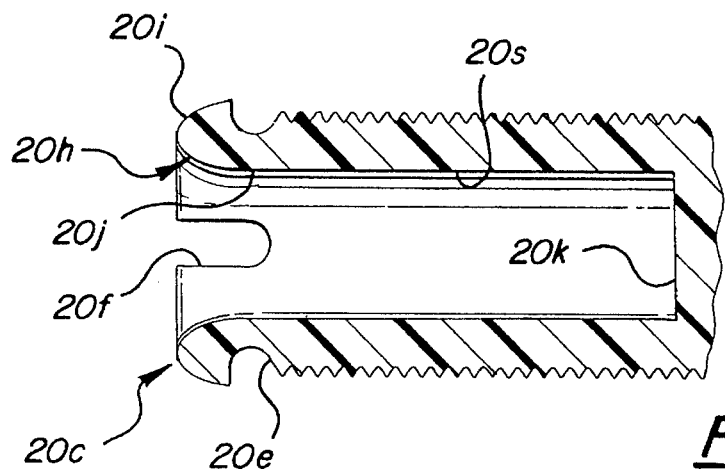
FIG-5
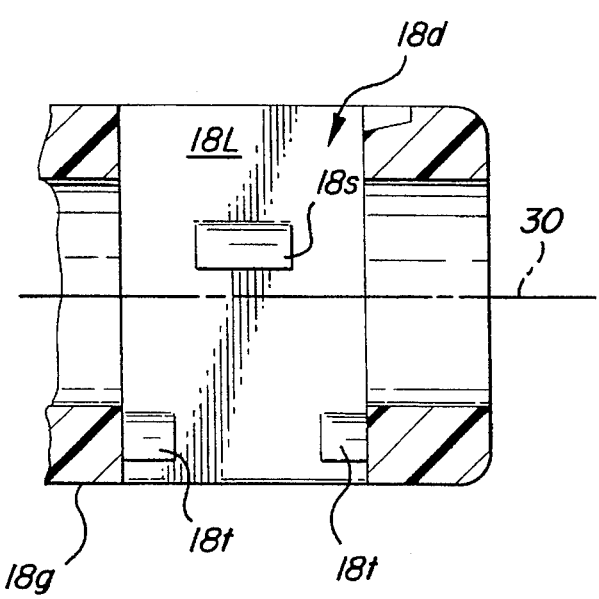
FIG-7
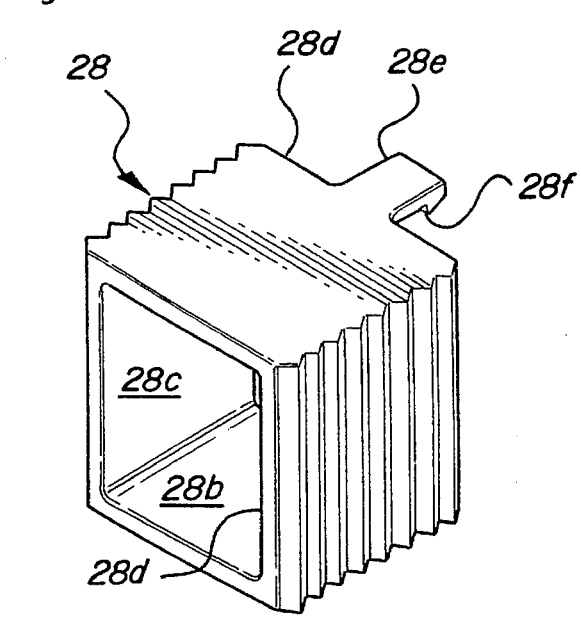
FIG-9
FIG-8

5,598,743

CORE WIRE LENGTH ADJUSTER

FIELD OF THE INVENTION

This invention relates generally to cable end fittings and more particularly to a cable end fitting for adjusting the length of the core wire of a cable assembly including a conduit and a core wire slidably positioned within the conduit.

BACKGROUND OF THE INVENTION

Cable end fittings are mounted for example on mounting posts of carburetors or throttle bodies of an automotive engine or connected with control levers such as a vehicle transmission lever for shifting a transmission. In order to facilitate installation of the cable assembly in the motor vehicle it is important that some means be provided to adjust the length of the core wire so as to readily provide a precise core wire length to provide precise control in each installation. Various arrangements have been proposed to provide such an adjustment including proposals wherein the conduit housing the core wire is adjusted and arrangements wherein the core wire itself is adjusted. Whereas the conduit and core wire adjustment arrangements are generally satisfactory they do exhibit certain disadvantages. Specifically, the prior art end fittings tend to be complicated and difficult to assemble, thereby increasing the cost of the product; they tend to be rather large, thereby complicating their installation in tight confines; and/or they require a complex mounting arrangement with respect to the associated motor vehicle subassembly.

SUMMARY OF THE INVENTION

This invention is directed to the provision of an improved end fitting for a cable assembly. More specifically this invention is directed to the provision of an improved end fitting for a cable assembly which is inexpensive to manufacture and assemble, is compact in size, and is readily mounted relative to the associated vehiclesubassembly.

The invention end fitting is intended for use with a cable assembly of the type including a conduit and a core wire slidably positioned within the conduit and functions to adjust the length of the core wire of the conduit. The end fitting includes a housing including a lock window, an elongated guide member mounted for axial sliding movement in the housing and adapted to be connected at its rear end to an end portion of the core wire, and a lock clip adapted to pass transversely through the lock window of the housing and mounted on the housing for transverse movement between an engaged position in which a serration on the lock clip is engaged with serrations on the guide member to preclude axial movement of the guide member and a disengaged position in which the serrations on the lock clip is disengaged from the guide member serration to allow axial movement of the guide member relative to the housing.

According to the invention, the lock window in the housing is defined between rear and forward walls of the housing, an aperture is provided in each housing wall, the guide member is slidably mounted in the apertures, the guide member defines a head portion at its forward end, and a limiting stop surface is defined on the front face of the forward wall of the housing in surrounding relation to the forward wall aperture and coacting with the head portion of the guide member to limit rearward movement of the guide member relative to the housing while allowing forward movement of the guide member relative to the housing. This arrangement provides a simple and inexpensive means of assembling the guide member to the housing while defining the forward and rearward movement of the guide member relative to the housing.

According to a further feature of the invention, the end fitting further includes means biasing the head portion of the guide member against the limiting stop surface on the front face of the housing forward wall. This arrangement provides a convenient means of defining the limit of rearward movement of the guide member relative to the housing while allowing resiliently resisted forward movement of the guide member relative to the housing to facilitate the coaction of the locking clip with the serrations on the guide member to provide the precise desired length of the core wire.

According to a further feature of the invention, the housing further includes a forward window spaced forwardly from the lock window and defined at its rearward end by the front face of the forward wall of the housing. With this arrangement, the head portion of the guide member is positioned in the forward window with the guide member head portion biased against the limiting stop surface on the front face of the forward wall.

According to a further feature of the invention, the biasing means comprises a coil spring positioned axially in the forward window with its rear end engaging the forward end of the guide member. In the disclosed embodiment of the invention, the guide member defines an axially extending socket opening in the front end of the guide member and the rear end of the coil spring is seated in the socket.

According to a further feature of the invention, the head portion of the guide member includes slots which allow the head portion to resiliently radially compress to an extent to allow movement of the head portion through the apertures in the forward and rear housing walls. This arrangement allows the guide member to be mounted on the housing by passing the guide member forwardly through the aligned apertures of the rear and forward walls of the housing with the head portion compressing as it passes through the forward housing wall aperture and thereafter expanding to engage the limiting stop surface and preclude axial withdrawal of the guide member from the housing.

According to a further feature of the invention, the end fitting further includes an accessory member which is mounted on the housing for movement between a shipping position in which it precludes movement of the lock clip to its engaged position and an operational position in which it provides a visual indication that the lock clip is in its engaged position.

According to a further feature of the invention, the lock window opens in an upper surface of the housing and the accessory member is mounted for sliding movement on the upper surface of the housing between its shipping position in which a portion of the accessory member interferes with the movement of the lock clip to its engaged position and its operational position in which the lock clip is positioned entirely within the window and the accessory member overlies the lock clip.

BRIEF DESCRIPTION OF THE DRAWINGS

FIG. 1 is a schematic perspective view illustrating a typical automotive application for the invention end fitting;

FIG. 2 is a cross-sectional view taken on line 2—2 of FIG. 1;

FIG. 3 is a top view of the invention end fitting;

FIG. 5 is a detail view of the forward end of a guide member utilized in the invention end fitting;

FIG. 6 is an exploded perspective view of selected portions of the invention end fitting;

FIGS. 7 and 8 are cross-sectional views taken on lines 7—7 and 8—8 respectively of FIG. 4; and FIGS. 9, 10, 11 and 12 are views illustrating an alternate embodiment of the invention end fitting.

DETAILED DESCRIPTION OF THE PREFERRED EMBODIMENT

The invention end fitting 10 is intended for use with a cable assembly of the type including a conduit 12 and a core wire 14 mounted for sliding movement within the conduit. The conduit is fixed at its forward end by, for example, a clamp 15, and the rear end of the conduit is suitably fixed by means not shown. The cable assembly and end fitting may be utilized for example to control the transmission in a motor vehicle by selectively moving a control lever controlling the transmission. End fitting 10 is utilized to adjust the effective length of the core wire 14 to compensate for the dimensional variations of the system componentry.

Figure 4:
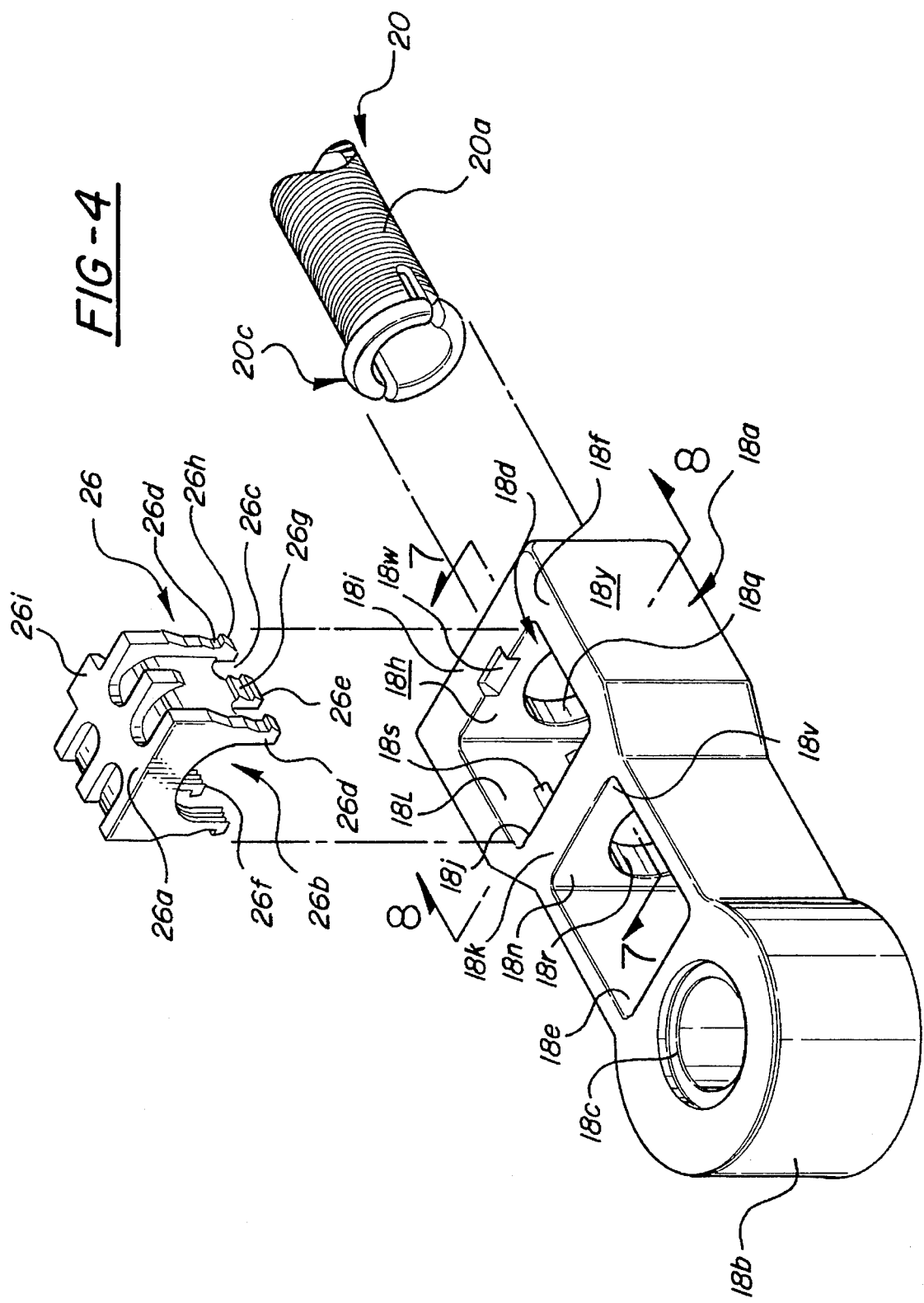
FIG. 4 is an exploded perspective view of the invention end fitting.

End fitting 10 in the embodiment of FIGS. 1–8 includes a housing 18, a guide member 20, a rod 22, a coil spring 24, and a locking clip 26. Rod 22 may be formed of a suitable ferrous material, coil spring 24 may be formed of a suitable spring steel material, and the remaining components of the end fitting may be formed of a suitable molded plastic material.

Housing 18 is elongated and includes a rear end 18a and a forward end 18b. Forward end 18b is configured, for example, to swivelly receive the upper end of the control lever that operator actuation of the core wire 14 as for example by a control lever located within the passenger compartment of the motor vehicle has the effect of moving transmission control lever and selectively shifting the transmission. The upper end of the control link 16 is received in known manner in a socket 18c in the forward end of the housing. Housing 18 further defines a lock window 18d proximate the rear end of the housing and a forward window 18e positioned between the rear window and the socket 18c. Lock window 18d has a rectangular configuration, extends totally transversely through the housing between the flat upper surface 18f of the housing and the flat lower surface 18g of the housing, and is defined by the front face 18h of the rear wall 18i of the housing, by the rear face 18j of the forward housing wall 18k, and by laterally spaced longitudinally extending housing interior side walls 18l.

Forward window 18e has a rectangular configuration, extends totally transversely through the housing between flat upper surface 18f and flat lower surface 18g, and is defined by laterally spaced longitudinally extending housing interior side walls 18m, by the front face 18n of forward wall 18k, and by a transverse face 18p defined rearwardly of socket 18c.

A circular central axial bore 18q passes through end wall 18i to define an aperture in that wall and a circular central axial bore 18r passes through forward wall 18k to define an aperture in that wall. Bores 18q and 18r are axially aligned and of equal diameter.

A single central wedge detent 18s is provided on each interior side wall 18l of lock window 18d, positioned slightly above the axial centerline 30 of the housing, and a pair of longitudinally spaced wedge detents 18t are provided on each interior side wall 18l below the centerline 30 and proximate the lower face 18g of the housing. Detents 18t are spaced apart by an axial distance slightly greater than the axial length of detent 18s and are spaced respectively forwardly and rearwardly of the vertical profile of the central detent 18s.

Guide member 20 is elongated, generally cylindrical, and includes a main body portion 20a, a rear end 20b, and a front head portion 20c. Main body portion 20a has a diameter generally corresponding to the diameter of bores 18q and 18r and defines a series of circumferential, circular serrations 20d with each serration lying in a plane normal to the axis 30. Head portion 20c is defined by a circumferential groove 20e and by a pair of diametrically opposed slots 20f. Head portion 20c is further defined by a blind central bore 20g opening in the front end of the guide member and coacting with the groove 20e to define an annular head structure 20h of triangular cross-sectional configuration defined by an outer conical surface 20i and an inner conical surface 20h blending with the forward end of blind bore 20g. Annular head structure 20h has a diameter slightly exceeding the diameter of main body portion 20a and of bores 18q and 18r.

Rod 22 has an elongated cylindrical configuration and includes a front knob portion 22a, a main body portion 22b, a neck portion 22c interconnecting main body portion 22b and front knob portion 22a, and a rear end 22d defining a blind rear cavity 22e. The front or free end 14a of core wire 14 is received in blind cavity 22e and fixedly secured to the rear end of rod 22 by a crimping or staking operation. The front end portion of rod 22, including the front knob 22a, neck 22c and the forward end of the main body portion of the rod, are moldingly encapsulated within the rear end of guide member 20 so that the core wire 14, the rod 22 and the guide member 20 form a continuous, axially aligned, elongated assembly.

Coil spring 24 is positioned at its forward end 24a around a central pin or peg 18u projecting centrally rearwardly from housing surface 18p and the rear end portion of the spring is received in guide member blind bore 20g with the extreme rear coil of the spring positioned against the blind end wall 22k of blind bore 20g.

Locking clip 26 has a generally block configuration and is sized to fit slidably within housing window 18d. The upper face 26a of the housing is generally flat and the lower face of the housing includes a semicircular cutout 26b which defines downwardly extending finger portions on either side of the cutout. Specifically, cutout 26b coacts with axially spaced slots 26c to define three finger portions on either side of the cutout including a pair of front and rear finger portions 26d and a central finger portion 26e. A series of detent ridges are defined on the outboard faces of the finger portions and a series of axially spaced semicircular serration 26f are defined within cutout 26b. Semicircular serrations 26f have a diameter, configuration, and axial spacing corresponding to the circular serrations 20d on the main body portion 20a of guide member 20 so that when the locking clip is brought into engagement with the guide member the semicircular serrations on the locking clip lockingly engage with the circular serrations on the guide member but the guide member is free to rotate in the housing to accommodate adjustments or alignments in the componentry of the associated vehicle subassembly.

To assemble the invention end fitting (and assuming that wire 14 has been crimped to the rear end of rod 22 and rod 22 has been moldingly encapsulated in the rear end of guide member 20), guide member 20 is moved forwardly relative to housing 18 to pass the head portion 20c of the guide member sequentially through bores 18q and 18r in the rear and forward walls of the housing with the head portion compressing radially as it passes through each bore and thereafter expanding radially to its relaxed configuration. The movement of the head portion through the bores 18q and 18r is facilitated by the conical pilot surface 20i on the head portion and the radially inward or compressing movement of the head portion as it passes through each bore is facilitated by the circumferential groove 20e and the slots 20f. As the head portion passes through the bore 18r in the forward wall 18k, the head expands and the spring 24, which has now been compressed, acts to resiliently press the head portion 20c against limiting stop surface 18v defined on surface 18n in surrounding relation to bore 18r so that the guide member is precluded from being withdrawn axially from the housing. It will be understood that coil spring 24 may be positioned in blind bore 20g prior to passage of the guide member through the bores 18q and 18r, in which case the forward end of the spring will be positioned over peg 18u as the guide member moves forwardly through the housing bores or, alternatively, spring 24 may be initially positioned on peg 18u and may be guided into blind bore 20g as the guide member is moved forwardly through the housing bores.

Following the insertion of the guide member into the housing, locking clip 26 is moved downwardly within lock window 18d to a disengaged position within the lock window wherein the serrations 26f on the locking clip are spaced from the serrations 20d on the guide member but wedge detents 18s coact with indentation 26g defined on the outboard face of central finger portions 26e to preclude inadvertent upward separation of the locking clip from the housing. Note that the forward and rearward finger portions 26d at this time are positioned above the wedge detents 18t and therefore play no part in the coaction between the locking clip and the housing. In this preassembled configuration, the end fitting and associated cable assembly may be shipped to a user whereafter the assembly may be fitted into an end user apparatus such as a motor vehicle.

At this point, in order to precisely align the forward end of the housing with the transmission control lever to provide precise control of the vehicle transmission, it is necessary to precisely adjust the effective length of the core wire. This is accomplished by moving the guide member forwardly against the resistance of spring 24 until proper precise core wire length is achieved, whereafter locking clip 26 is moved downwardly to an engaged position in which the serrations 26f on the locking clip lockingly engage the serrations 20d on the guide member to lock the guide member in its position of precise adjustment relative to the housing and thereby lock the end fitting in the position defining the precise desired effective length of the core wire. In the engaged position of the locking clip with the guide member, the locking clip is held in locking engagement with the housing (whereby to preclude inadvertent disengagement of the locking clip serrations and the guide member serration and consequent change in the effective length of the core wire) by the locking interengagement of teeth 26h on the lower ends of the finger portions 26d with the wedge detents 18t but guide member 20 is free to rotate in the clip to provide adjustments or alignments in the componentry of the associated vehicle subassembly. In this final engaged position, the central finger portions 26e are disassociated from the detents 18s and therefore play no part in the coaction between the locking clip and the housing.

Proper orientation of the locking clip relative to the housing is ensured by a tab 26i projecting from the upper rear end of the locking clip. With the locking clip properly oriented relative to the housing, tab 26i fits into a cavity or seat 18w defined in the upper face 18f of the housing proximate the upper edge of housing rear wall 18i.

Figure 10:
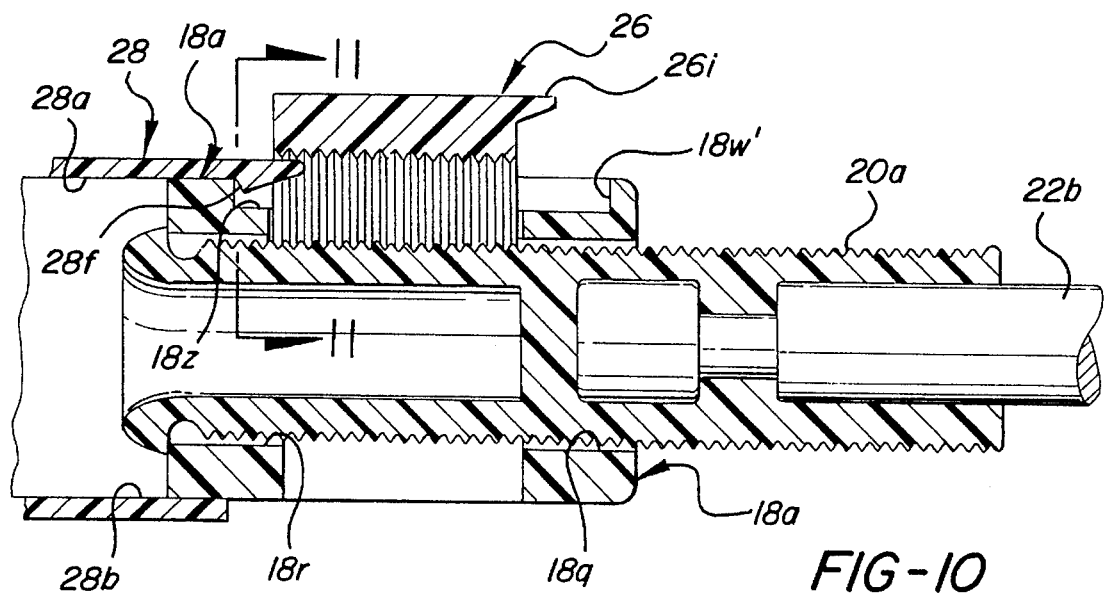
Figure 12:
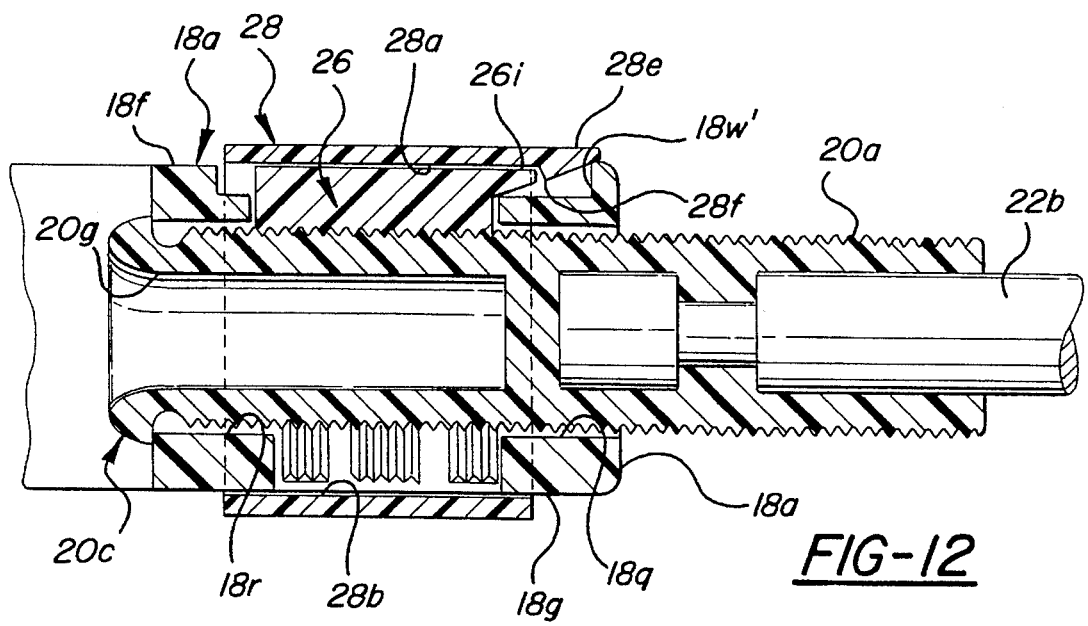
Figure 11:
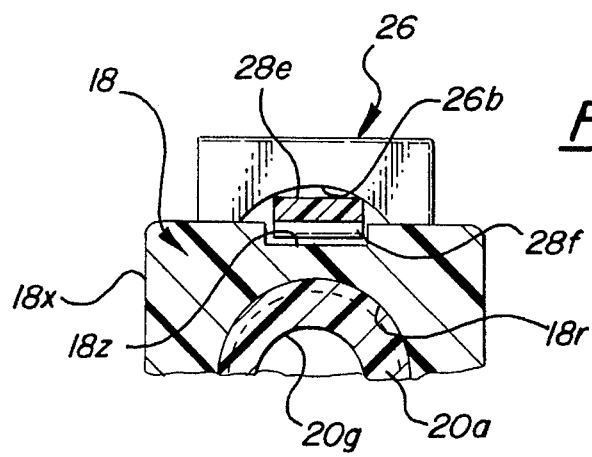

The alternate end fitting embodiment seen in FIGS. 9–12 is identical to the end fitting embodiment of FIGS. 1–8 with the exception that the end fitting additionally includes a cover or accessory member 28 which initially functions to prevent the lock clip 26 from moving to its fully locked position during shipping and thereafter functions to provide a visual indication that the clip has been moved to its fully locked position.

Cover 28 is formed of a suitable molded plastic material and has a hollow, closed loop, rectangular configuration which is sized to fit slidably over the rear end 18a of the housing. Specifically, cover 28 defines four interior walls 28a, 28b, 28c and 28d which slidably engage housing surfaces 18f, 18g, 18x and 18y, respectively. Cover 28 is movable slidably on housing 18 between a shipping position, seen in FIG. 10, in which a tongue 28e projecting rearwardly from the rear edge 28d of the upper wall of the cover is positioned in cutout 26b of the lock clip to preclude movement of the clip to its fully locked position, and a fully locked or operational position, seen in FIG. 12, in which the cover has been momentarily slid forwardly to free tongue 28e from cut-out 26b, to allow the lock clip to be moved to its fully locked position, whereafter the cover has been slid rearwardly to overlie the fully locked clip.

Tongue 28e defines an angled ledge 28f which coacts with a pocket 18z provided in the upper housing face 18f forwardly of window 18d to define the shipping position of the cover and coacts with locking clip tab 26i to define the fully locked position of the cover. The angled configuration of ledge 28f allows the momentary forward movement of the cover to allow movement of the locking clip to its fully locked position. Note that housing cavity 18w' is modified (as compared to cavity 18w in the embodiment of FIGS. 1–8) to allow proper locking coaction between tongue 28e and tab 26i. It will be seen that cover 28 serves to prevent inadvertent movement of clip 26 to its fully locked position during shipping of the end fitting and further functions, once the end fitting has been incorporated in the vehicle subassembly and the locking clip has been moved to its fully locked position, to provide a visual indication that the locking clip has, in fact, been moved to its fully locked position.

The invention end fitting will be seen to provide a cable assembly which may be readily assembled for shipping purposes by a simple forward movement of the guide member relative to the housing and which, once installed by the end user, may be readily adjusted to provide the precise core wire length required for the particular installation.

Whereas preferred embodiments of the invention has been illustrated and described in detail it will be apparent that various changes may be made in the disclosed embodiments without departing from the scope or spirit of the invention.

I claim:

1. A cable assembly including:

a conduit;

a core wire slidably positioned within the conduit;

a housing including a rear wall having an aperture, a forward wall having an aperture axially aligned with the aperture in the rear wall, and a lock window positioned between said rear and forward walls;

an elongated guide member slidably received in said apertures for axial movement relative to said housing, including a plurality of axially spaced serrations, defining a head portion at its forward end, and fixedly secured at its rearward end to an end portion of the core wire;

a locking clip adapted to pass transversely through said window, including at least one serration for locking coaction with the serrations on the guide member, and mounted on the housing for transverse movement between an engaged position in which said one serration is engaged with said guide member serrations to preclude axial movement of said guide member relative to said housing and a disengaged position in which said one serration is disengaged from said guide member serrations to allow axial movement of said guide member relative to said housing;

a limiting stop surface on a front face of said forward wall in surrounding relation to the forward wall aperture and coacting with said guide member head portion to limit rearward movement of said guide member relative to said housing while allowing forward movement of the guide member relative to the housing; and the cable assembly including means biasing said guide member head portion against said stop surface while allowing resiliently resisted forward movement of the guide member relative to the housing.

2. A cable assembly according to claim 1 wherein the serrations on the guide member and on the locking clip have a circular configuration so that the guide member may rotate relative to the locking clip with the locking clip in its engaged position.

3. A cable assembly according to claim 1 wherein:

the head portion of said guide member includes slots which allow the head portion to resiliently radially compress to an extent to allow movement of the head portion through the apertures in said forward and rear housing walls, whereby said guide member may be mounted on said housing by passing said guide member forwardly through said aligned apertures with the head portion compressing as it passes through the forward housing wall aperture and thereafter expanding to engage said limiting stop surface and preclude axial withdrawal of said guide member from said housing.

4. An end fitting for adjusting the length of the core wire of a cable assembly including a conduit and a core wire slidably positioned within the conduit, said fitting including:

a housing including a rear wall having an aperture, a forward wall having an aperture axially aligned with the aperture in the rear wall, and a lock window positioned between said rear and forward walls;

an elongated guide member slidably received in said apertures for axial movement relative to said housing, including a plurality of axially spaced serrations, and adapted to be connected at its rearward end to an end portion of the core wire;

a locking clip adapted to pass transversely through said window, including at least one serration for locking coaction with the serrations on the guide member, and mounted on the housing for transverse movement between an engaged position in which said one serration is engaged with said guide member serrations to preclude axial movement of said guide member relative to said housing and a disengaged position in which said one serration is disengaged from said guide member serrations to allow axial movement of said guide member relative to said housing; and means operative in response to forward axial movement of the guide member through the aperture in the rear wall and thereafter through the aligned aperture in the forward wall to preclude rearward axial movement of the guide member relative to the housing;

the operative means including a head portion on a forward end of said guide member which is resiliently radially compressible in response to forward movement of the head portion through the aperture in the forward wall and thereafter expands radially to preclude rearward axial withdrawal of the guide member from the housing;

the fitting further including a spring bearing against the forward end of the guide member to resiliently urge the head portion against the forward wall.

5. An end fitting according to claim 4 wherein the serrations on the guide member and on the locking clip have a circular configuration so that the guide member may rotate relative to the locking clip with the locking clip in its engaged position.

6. An end fitting for adjusting the length of the core wire of a cable assembly including a conduit and a core wire slidably positioned within the conduit, said fitting including:

a housing including a rear wall having an aperture, a forward wall having an aperture axially aligned with the aperture in the rear wall, a lock window positioned between said rear and forward walls, and a forward window spaced forwardly from the lock window and defined at its rearward end by a front face of said forward wall;

an elongated guide member slidably received in said apertures for axial movement relative to said housing, including a plurality of axially spaced serrations, defining a head portion at its forward end positioned in said forward window and having a diameter exceeding the diameter of the forward wall aperture, and adapted to be connected at its rearward end to an end portion of the core wire; and a locking clip adapted to pass transversely through said lock window, including at least one serration for locking coaction with the serrations on the guide member, and mounted on the housing for transverse movement between an engaged position in which said one serration is engaged with said guide member serrations to preclude axial movement of said guide member relative to said housing and a disengaged position in which said one serration is disengaged from said guide member serrations to allow axial movement of said guide member relative to said housing.

7. An end fitting according to claim 6 wherein said head portion is resiliently radially expansible in response to forward axial movement of the guide member through the housing apertures, whereby to allow the guide member to be mounted slidably in the apertures by passing the guide member axially forwardly through the apertures, but is radially incompressible in response to retrograde rearward axial movement of the guide member relative to the housing, whereby to preclude rearward axial withdrawal of the guide member from the housing.

8. An end fitting according to claim 6 wherein the fitting further includes a spring positioned in said forward window, engaging the forward end of said guide member, and operative to press the guide member rearwardly to move the guide member head portion against a stop surface defined on said front face of said forward wall in surrounding relation to said forward wall aperture.

9. An end fitting for adjusting the length of the core wire of a cable assembly including a conduit and a core wire slidably positioned within the conduit, said fitting including:

a housing defining a window;

an elongated guide member adapted to be fixedly associated at one end thereof with the core wire and adapted to be mounted at another end thereon on said housing with the guide member extending axially and with at least one serration defined on the guide member positioned in said window;

a lock clip adapted to be positioned in said window, including at least one serration for locking coaction with the guide member serration, and mounted on the housing for transverse movement between an engaged position in which the lock clip serration is engaged with the guide member serration to preclude axial movement of the guide member relative to the housing and disengaged position in which the lock clip serration is disengaged from the guide member serration to allow axial movement of the guide member relative to the housing; and an accessory member mounted on the housing for axial movement between a shipping position in which the accessory member precludes movement of the lock clip to its engaged position and an operational position in which the accessory member provides a visual indication that the locking clip is in its engaged position.

10. An end fitting according to claim 9 wherein:

the window opens in an upper surface of the housing; and the accessory member is mounted for sliding axial movement on an upper surface of the housing between the shipping position of the accessory member in which a portion of the accessory member interferes with the movement of the lock clip to the engaged position of the lock clip and the operational position of the accessory member in which the lock clip is positioned entirely within the window and the accessory member overlies the lock clip.

11. An end fitting according to claim 10 wherein the accessory member has a closed loop configuration and fits slidably over the housing.

12. An end fitting for adjusting the length of the core wire of a cable assembly including a conduit and a core wire slidably positioned within the conduit, said fitting including:

a housing including a rear wall having an aperture, a forward wall having an aperture axially aligned with the aperture in the rear wall, and a lock window positioned between said rear and forward walls;

an elongated guide member slidably received in said apertures for axial movement relative to said housing, including a plurality of axially spaced serrations, defining a head portion at its forward end, and adapted to be connected at its rearward end to an end portion of the core wire;

a locking clip adapted to pass transversely through said window, including at least one serration for locking coaction with the serrations on the guide member, and mounted on the housing for transverse movement between an engaged position in which said one serration is engaged with said guide member serrations to preclude axial movement of said guide member relative to said housing and a disengaged position in which said one serration is disengaged from said guide member serrations to allow axial movement of said guide member relative to said housing; and a limiting stop surface on a front face of said forward wall in surrounding relation to the forward wall aperture and coacting with said guide member head portion to limit rearward movement of said guide member relative to said housing while allowing forward movement of the guide member relative to the housing;

the end fitting further including means biasing said guide member head portion against said limiting stop surface while allowing resiliently resisted forward movement of the guide member relative to the housing;

the housing further including a forward window spaced forwardly from the lock window and defined at its rearward end by said front face of said forward wall so that said head portion of said guide member is positioned in said forward window with said head portion biased against said limiting stop surface.

13. An end fitting according to claim 12 wherein:

said biasing means comprises a coil spring positioned axially in said forward window with its rear end engaging the forward end of said guide member.

14. An end fitting according to claim 13 wherein:

the guide member defines an axially extending socket opening in the forward end of the guide member; and the rear end of said spring is seated in said socket.

* * * * *